Patented May 23, 1944

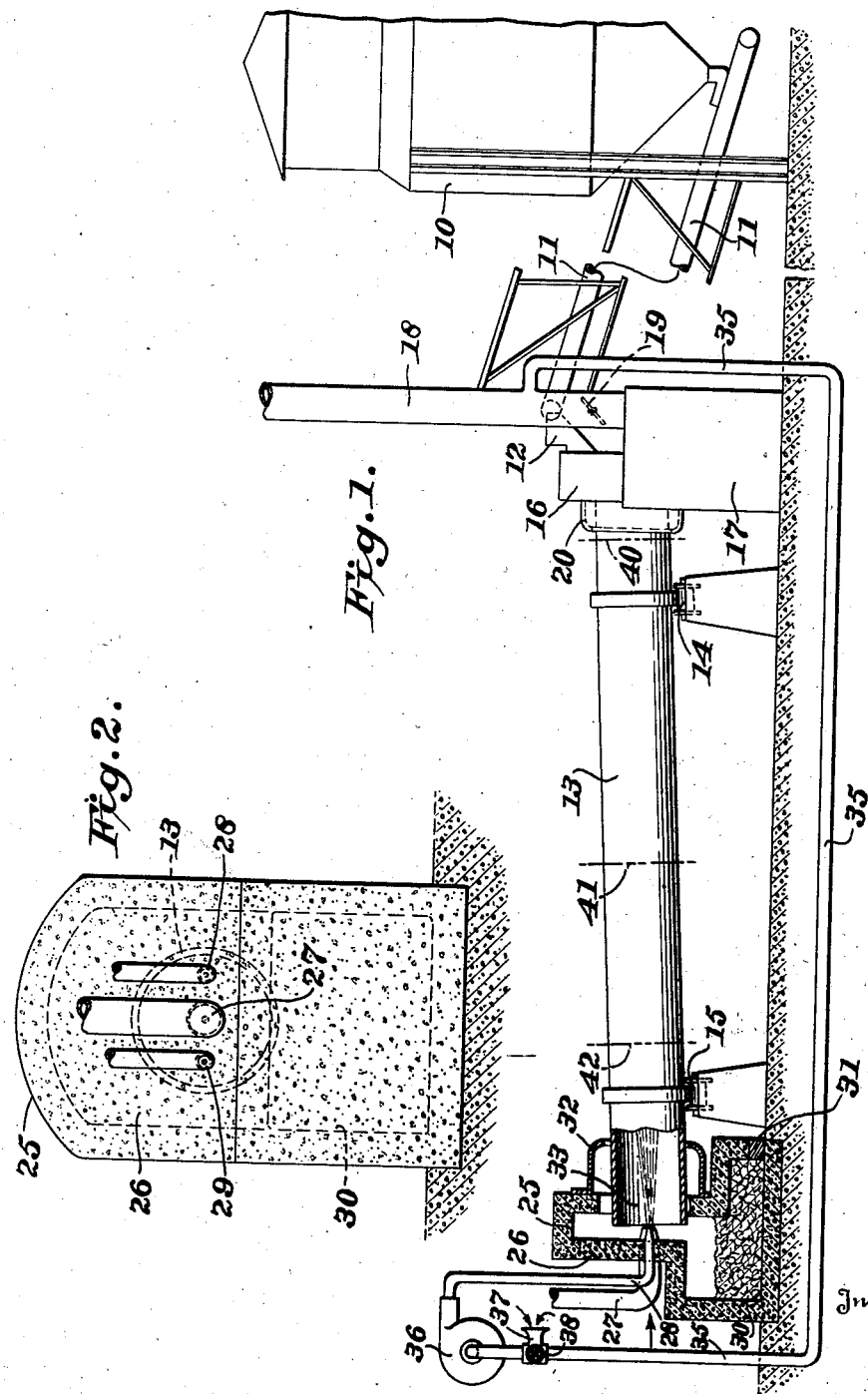

2,349,688

UNITED STATES PATENT OFFICE 2,349,688

METHOD OF PRODUCING LOW CARBON IRON OR STEEL

Flavius C. Wood, Jr., Washington, D. C.

Application July 28, 1942, Serial No. 452,625

15 Claims. (Cl. 75—38)

The present invention relates to a new and improved method of producing low carbon iron or steel directly from iron ore.

The primary object of the invention is to reduce iron ore to metallic iron or steel in commercially useable form, without the necessity for the use of blast furnaces or the like, or of first producing high carbon iron such as pig iron.

A further important object of the invention is to reduce iron ore, in the presence of suitable slag forming materials, to a molten iron or steel, in the form of small globules or pellets embedded in the slag, without raising the carbon content of the metal to a degree approaching pig iron.

A further object of the invention is to produce such iron or steel directly from iron ore in the presence of fluxes and a reducing gas, by the use of standard cement making equipment, such as Portland cement kilns with only minor variations, if any. To this end, the invention aims to make use of the large and substantial cement making equipment of the country, for the producing of low carbon iron or steel, adapted to alleviate the present shortage of scrap iron and scrap steel, required for the steel industry in the production of steel in open hearth and similar furnaces.

I have discovered that by slight modifications and by the use of proper control, rotary cement kilns may be converted to the production of malleable iron or low carbon steel direct from iron ore. In accordance with my new process iron ore, in the presence of a molten slag and in a reducing atmosphere in the rotary kiln is reduced to minute particles of metallic iron, which particles are then agglomerated into globules or pellets in the slag as a protective matrix, without increasing the carbon content of the metal. The resulting product, consisting of low carbon iron or steel globules embedded in semi-liquid slag, may be cooled and later used as a diluent, in place of scrap, in an open hearth charge or it may be fed directly into a reverberatory furnace and the slag separated from the molten metal.

Basically, the process of the present invention consists in the following procedure. First, the ore, such as hemitite, is crushed or ground to pass through a one-quarter inch screen, and mixed with limestone and, if necessary, siliceous materials ground to substantially the same size and in proportions substantially the same as the charges conventionally used in blast furnaces. If desired, the materials may be mixed in proper proportions before grinding and screening, or the grinding and screening may be accomplished before-hand. Since adequate crushing and grinding facilities are available in all standard cement making plants, it is contemplated that the materials will be prepared at the plant.

The properly proportioned materials, in the absence of reducing agents, such as coal, coke, or other carbonaceous materials, are then charged into the upper end of the rotary cement kiln by the same equipment normally used to charge cement making materials. The kiln is fired by any of the usual fuels employed in cement manufacture, such as oil, natural gas, pulverized coal, or the like. As pointed out below, and for special purposes, auxiliary burners preferably are used, in addition to the standard, main burner or burners of the cement kiln. A highly reducing atmosphere is maintained throughout the lower portion of the cement kiln and the temperature therein is maintained sufficiently high to convert the flux material into a semi-liquid, molten slag. The oxygen in the metallic oxides combines with the carbon in the reducing atmosphere and produces carbon dioxide or carbon monoxide, leaving minute particles of substantially pure, low carbon iron in the slag. As the mixture of slag and iron particles is agitated and moved through the rotary kiln, there is a tendency for the iron particles to agglomerate, particularly at the lower end thereof where the temperature is at the highest. The agglomeration continues until globules or pellets of iron or steel are formed in the slag as a protective matrix. The resulting mass is similar to the clinker discharged from a cement kiln, except that it is more fluid, and comprises molten slag enclosing iron or steel globules. The mass may be collected in the pit conventionally provided at the discharge end of a rotary cement kiln and removed from time to time. The inclusion of the metallic iron globules in the non-ferrous slag matrix effectively prevents re-oxidation of the iron when the clinker is removed from the pit, if the clinker at that time is otherwise at an oxidizing temperature.

The resulting clinker may be used directly as a portion of the charge for a blast furnace, open hearth or reverberatory furnace or the like, and the low carbon content of the iron, as compared to the carbon content of pig iron, makes it an effective substitute for iron or steel scrap in the usual furnace charge.

If desired, a reverberatory type of furnace may be installed directly at the lower end of the rotary cement kiln. If so, the semi-molten clinker consisting of iron or steel globules and molten slag may be dropped immediately into the furnace and sufficient heat applied to convert the clinker into liquid condition, thereby allowing the metallic iron or steel to separate from the slag. As is customary with reverberatory furnaces, the metal can be tapped off into molds and the slag drawn off at a higher level and discarded.

In addition to the general features of the process outlined above, the present invention includes a number of special features of control and procedure, as more particularly described below.

It has been proposed heretofore to attempt to convert iron ore directly into so-called "sponge iron" by feeding through a rotary metallurgical furnace, a mixture of ore, slag forming fluxes, and reducing agents such as coke, or anthracite coal. I have found this procedure to be undesirable for numerous reasons, the principal ones of which are that it is difficult to prevent the premature burning of the carbonaceous material, and it is difficult, if not impossible, to prevent an undesirable increase in the carbon content of the end product. Moreover, great care must be exercised to prevent the re-oxidation of the sponge iron when brought into contact with air or an oxidizing atmosphere, since the product is extremely unstable and readily converts back into an oxide of iron.

In accordance with the present invention, the ore is mixed with basic rock, such as limestone, together with silica in such proportions as to produce a suitable slag, such as a blast furnace slag, but reducing agents are deliberately omitted from the charge. The slag and the ore should be so calculated that the slag will be from 1 to 2.5 silicate degree, metallurgically speaking. This slag acts not merely as an agent to coat the iron particles and prevent re-oxidation thereof, but, in addition, acts as a collecting agent to agglomerate the iron particles into globules in the matrix, as the mixture is tumbled and gently agitated during its passage through the rotary kiln.

The metallic globules produced in accordance with this method are not "sponge iron" as that term is understood in the art, but, on the contrary, are particles of malleable iron or low carbon steel, gradually built up in the mass.

The iron ore, in the presence of the slag forming flux material, is reduced by maintaining a reducing atmosphere throughout the lower part of the rotary kiln. The reducing atmosphere, in turn, is maintained by regulation of the combustion of the fuel used, and by the injection under high pressure of auxiliary fuel, in the presence of flue gases as a carrying agent, if desired, with or without the addition of auxiliary air.

The burners conventionally employed in cement kilns produce temperatures at the lower end ranging between 1400° C. and 1500° C., which temperatures are entirely adequate for carrying out the process of the present invention. The atmosphere in the kiln may be maintained highly reducing by increasing the amount of fuel ordinarily employed by the main burners of the kiln, while maintaining the amount of air substantially constant, without materially reducing the temperature in the kiln. As stated above, any fuels commonly used and available at the plant may be employed, such as pulverized coal or coke, natural gas, fuel oil, or the like. The important thing is to control the amount of fuel relative to the amount of air so as to produce a strongly reducing atmosphere and a sufficiently high temperature in the reducing zone (between 800 and 1000° C.) to effect the reduction of the ore.

Throughout the primary reducing zone, spaced inwardly from the lower end of the kiln, it is important that the atmosphere be highly reducing in character, but the temperature need not be as high as at the lower end where the reduced particles of iron or steel are agglomerated in the slag to form globules. In order to produce this zone of highly reducing atmosphere, one or more additional fuel feeding nozzles may be employed at the lower end of the furnace and arranged so as to project an auxiliary supply of fuel all the way through the lowermost, highly heated zone inwardly to the desired point in the reducing zone. These additional charges of fuel may be carried on a blast of gases under relatively high pressure, such as flue gases drawn from the stack, with or without the addition of air, as particular conditions demand. If flue gases alone are used, the fuel, together with carbon dioxide, moisture, and carbon monoxide may be projected to the reducing zone of the kiln, to make the atmosphere therein as highly reducing as is desired.

Another important feature of the invention is the maintenance of a predetermined, super-atmosphere pressure throughout the rotary kiln, which is accomplished by providing suitable loose seals at the ends thereof and by the use of a damper in the stack, in combination with proper control of the introduction of fuel and air at the lower end of the kiln. The super-atmospheric pressure, maintained from a range slightly above atmosphere to several ounces per square inch, serves to prevent the entrance of air into the kiln and thereby prevents the re-oxidation of the reduced ore. Moreover, by regulating the pressure and by varying the amount of auxiliary fuel fed into the kiln, and hence the characteristics of the atmosphere, the intensity of the reducing action may be varied, as well as the amount of carbon absorbed from the atmosphere by the metallic iron, thus making it possible to produce varying grades of carbon steel. By varying the degree of pressure in the kiln, it is possible to effect a differential selection of other metals that may be reduced and incorporated in the steel mixture. Some extraneous metals may be excluded and others included in the end product, and, by calculating the admixture of alloy metals, oxides, or other minerals at the feed end of the kiln, different products may be obtained, as desired.

It is an important feature of the present invention that substantially all of the reducing action is accomplished at the lower end of the kiln and that the control of the reducing zone and the agglomerating zone is effected from the lower end.

The auxiliary burners and the flexibility of their control as to the amount and quality of fuel and air or flue gases injected thereby makes it possible to maintain a uniform temperature throughout a zone of reasonable length, as desired adjacent to the lower end of the kiln, thereby maintaining the material in the kiln at a constant temperature for a predetermined length of time during its passage through the kiln. This constant temperature zone promotes the efficient agglomeration of the metallic content of the mixture into larger units of metal.

The temperatures in the agglomerating zone adjacent the end of the kiln are higher than are generally used in the production of so-called sponge iron, and, although below the melting point of steel ingots or the like, are sufficiently high to fuse the minute low carbon iron or steel particles and permit the same to agglomerate into globules or pellets. In accordance with my invention, the temperature is raised above that used in sponge iron processes, but it does not put the metallic material completely into solution.

If desired, the process can be carried one step further either by the addition to the rotary kiln of a short section lined with a carbonaceous refractory, such as carborundum brick, so that the temperature can be raised sufficiently to convert the globules into molten steel, or the product of the kiln may be discharged directly into a reverberatory type of furnace or the like. If so, the metal, by the addition of a slight amount of heat, can be converted completely into molten solution which will separate from the slag, in the usual manner, so that each can be tapped separately.

As pointed out above, the process of the present invention is particularly adapted to be carried out with conventional Portland cement making equipment now available in many parts of the country. In the accompanying drawing I have shown, diagrammatically, a conventional cement making plant, in order to illustrate the equipment which may be employed.

In the drawing,

Figure 1 is a diagrammatic side elevation, and

Figure 2 is an end elevation of the lower end of the rotary kiln.

Figure 1 shows, diagrammatically, a standard Portland cement making installation, including a bin 10 for the storage of materials, a conveyor 11 leading from the lower end thereof to a feed hopper 12 associated with the calcining kiln. In accordance with the method of the present invention, the bin 10 may be filled with a mixture of crushed or ground iron ore and slag-forming flux materials. If desired, a plurality of separate bins for different materials may be employed, in combination with individual conveyors adapted to deliver variable proportions of the materials to the hopper 12 or to a collecting bin, such as the bin 10.

The furnace comprises a rotary barrel 13, supported in the usual manner for rotation on rollers 14, 15 and driven by conventional means, not shown. At its upper end the kiln 13 is enclosed within a hood 16, communicating with the infeed chute 12 at its upper end and with a conventional dust collector 17 therebelow. The latter opens into a stack 18 adapted to be controlled by a damper, diagrammatically represented at 19. A shield 20 provides a loose seal between the margins of the rotary kiln 13 and the hood 16, which prevents the escape of flame and makes it possible to raise the pressure within the furnace above atmosphere.

The lower end of the kiln is enclosed within a hood 25, having a back wall 26 through which a main burner 27 and auxiliary burners 28, 29 project. The hood 25 opens downwardly into an enclosed pit 30 provided with a plugged cleanout opening 31.

A shield 32 provides a loose seal around the lower end of the rotary kiln 13 and functions in the same manner as described above.

The main burner, represented diagrammatically, at 27 may be the same as is conventionally employed in cement making plants and may be fed by any type of fuel as mentioned above. The auxiliary burners 28, 29 may be supplied with a blast of flue gases, taken from the stack 18 by a conduit 35 and delivered to individual blowers or compressors 26, one discharging directly into each burner. Air may be admitted to each flue gas line through a branch pipe 37 controlled by a valve 38. Liquid, gaseous or pulverized fuel may be combined with the stream or jet of gas, or gas and air, and projected to the desired points within the rotary kiln 13. By varying the pressure, the air content and the fuel content, and by adjusting the auxiliary nozzles 28, 29, their effect may be varied widely and the reducing atmosphere in the reducing zone, spaced from the lower end 33 of the rotary kiln, controlled at will as to position in the kiln and chemical composition.

The invention contemplates separate, independent controls, for the individual auxiliary burners and for the main burner 27. For instance, one auxiliary burner might be employed to project a stream of flue gases and fuel with great force inwardly a substantial distance to produce a highly reducing atmosphere in the reducing zone, whereas the other burner might be adjusted to project a mixture of air and fuel a lesser distance, to produce a hot flame and a high degree of temperature in the zone where the agglomerating takes place. Moreover, the burners may be adjusted to adjust the positions of these zones. One burner may be employed in this manner to maintain the temperature throughout the agglomerating zone substantially constant from end to end, by projecting a flame forwardly beyond the larger flame produced by the main burner. Other adjustments of the burners will be apparent to those skilled in the art, to produce special conditions in the kiln.

In the operation of the apparatus, the mixture of iron ore and slag-forming fluxes is continuously fed into the upper end of the kiln 13 by the hopper 12 and is continuously moved through the kiln. The damper 19 is adjusted so as to produce a pressure in the kiln above atmosphere, at the desired degree. Throughout the upper portion of the kiln, as represented by the space between lines 40, 41, the material is preheated and volatile impurities are driven off. In the upper portion of the zone the material is dehydrated. Later it is calcined and such impurities as zinc, sulphur, phosphorus, cadmium and the like oxidized and vaporized. These metals are oxidized by the carbon dioxide in the atmosphere and carried off through the stack as vapors or gases.

The absence of solid carburizing agents in the mixture is important at this stage of the process, since, if such agents were present, these metals would form carbides and would remain in the mass as impurities, eventually incorporated in the end product. By omitting carburizing agents in this purifying zone and by maintaining an oxidizing atmosphere therein, these metals are oxidized, vaporized and driven off.

At the lower end of the purifying zone, the flux materials are very intimately mixed with the iron ore, but they will not yet be converted into a molten slag. When the material enters the reducing zone, between lines 41, 42, it comprises iron oxide intimately mingled with finely divided slag forming materials. The atmosphere in the zone between lines 41 and 42 is highly reducing in character, with the result that the iron oxide material, being tumbled and agitated in the flux, is exposed thereto and is converted into metallic iron particles and gaseous carbon dioxide and carbon monoxide, which gases pass upwardly through the kiln to the stack 18, with the above-mentioned impurities. The minute particles of metallic iron do not adsorb large amounts of carbon, since they are not intimately mixed with solid carbonaceous materials. Their carbon content can be varied from substantially zero to a reasonable amount, by increasing the amount of carbon in the atmosphere and by increasing the pressure in the kiln.

As the mixture of slag and minute particles of metallic iron or steel embedded therein moves into the agglomerating zone between line 42 and the lower end of the kiln, the temperature of the material is raised so as to make the slag more liquid and to agglomerate the metallic particles, due to their tumbling and agitation in the kiln. The iron particles have a greater affinity for each other than for the slag. Hence, the individual particles tend to cluster together into globules or pellets, to the exclusion of the slag, so that the end product discharged into the pit 30 in the form of molten clinkers consists of globules or pellets of low carbon iron or steel embedded in a non-ferrous, protective slag. The mass in the pit 30 may be removed from time to time through the clean-out opening 31, or a conveyor may be employed to withdraw the material at substantially the same rate that it is deposited in the pit.

As stated above, the end product may be cooled and stored and used as a diluent in an open hearth charge, in place of the usual iron or steel scrap, or the molten mass may be delivered directly to a reverberatory furnace, where by the addition of a relatively small amount of heat, the slag and the molten metal may be separated and tapped off in the usual manner.

Various alloying elements, their oxides, or their salts, such as manganese, chromium, tungsten, molybdenum, nickel, cobalt, or vanadium, may be added to the mix in the hopper 12, and by the proper control of the temperature in different zones and the pressure in the kiln, these metals may be added to the end product, to produce alloy steels in the clinker.

It will be understood that the invention is, of course, not limited to the procedural details described above or to the apparatus elements shown diagrammatically in the accompanying drawing, since all modifications coming within the scope of the appended claims and their equivalents are included.

I claim:

1. A process for the production of low carbon iron or steel directly from iron ore, which comprises mixing the ore with slag forming flux materials in the absence of carburizing agents, feeding the mix through a rotary kiln at a temperature to form a molten, semi-liquid slag from said materials, maintaining a reducing atmosphere in a portion of the kiln and thereby converting the iron oxide in the ore into minute particles of metallic iron, and continuously agitating the molten slag and the particles of metallic iron and thereby causing said particles to agglomerate into globules or pellets in said molten slag as a matrix.

2. A process for the production of low carbon iron or steel directly from iron ore, which comprises feeding a mixture of crushed or ground iron ore and slag forming flux materials in the absence of solid carburizing agents through a rotary kiln, controlling the temperature adjacent the infeed end of the kiln to drive off volatile impurities, raising the temperature of the material and maintaining a reducing atmosphere throughout a portion of the path of travel thereof to convert the iron oxide in the ore into particles of metallic iron and to convert the flux into a molten, semi-liquid slag, and thereafter raising the temperature of the mixture and agglomerating said particles of metallic iron into globules or pellets in the molten slag as a protective matrix.

3. A process for the production of low carbon iron or steel directly from iron ore which comprises feeding a mixture of ore and slag forming flux materials through a pre-heating zone, a reducing zone, and an agglomerating zone, continuously agitating and tumbling the mixture during its passage through said zones to drive off volatile impurities to reduce the iron oxides into particles of metallic iron, to form molten, semi-liquid slag and to agglomerate said particles into globules or pellets in the slag as a protective matrix.

4. The process for the production of low carbon iron or steel directly from iron ore which comprises feeding a mixture of crushed iron ore and slag forming flux materials in the absence of solid carburizing agents through a rotary kiln, maintaining the pressure of the atmosphere in the kiln above outside atmospheric pressure, subjecting the mixture successively to temperatures and atmospheres serving to reduce the iron oxides in the ore to particles of metallic iron, to form a molten, semi-liquid slag, and to agglomerate the particles into globules or pellets in the slag as a protective matrix.

5. A method for producing low carbon iron or steel for use as an ingredient in an open hearth charge, which comprises reducing iron ore in the presence of a slag forming material in a reducing atmosphere and in the absence of solid carburizing agents into particles of metallic iron, agglomerating the particles into globules or pellets in the molten slag as a protective matrix by gently agitating and tumbling the mixture, and cooling the molten cinder so produced.

6. A process for the production of low carbon iron or steel directly from iron ore which comprises feeding a mixture of iron ore and slag forming flux materials ground to pass through a one-quarter inch mesh screen through a rotary kiln in the absence of solid carburizing agents, maintaining the temperature throughout an initial portion of the kiln to drive off volatile impurities and to oxidize and vaporize other impurities, maintaining a highly reducing atmosphere in a subsequent portion of the kiln and a temperature therein sufficient to reduce the iron oxides in the ore to minute particles of metallic iron, and maintaining the temperature at a subsequent portion of the kiln sufficiently high to melt the flux materials into slag and to agglomerate the particles into globules or pellets in the molten slag as a protective matrix.

7. A process for the production of low carbon iron or steel directly from iron ore which comprises heating a mixture of iron ore and slag forming flux materials through a rotary kiln in the absence of solid carburizing agents, maintaining an oxidizing atmosphere in an initial portion of the kiln at a temperature to oxidize and vaporize such impurities in the ore as zinc, sulphur, phosphorous and cadmium, maintaining a highly reducing atmosphere in a subsequent portion of the kiln at a temperature between 800° and 1000° C. to reduce the iron oxides in the ore to minute particles of metallic iron, maintaining the temperature in a subsequent portion of the kiln sufficiently high to melt the flux materials into a molten, semi-fluid slag and to agglomerate the particles into globules or pellets in the molten slag as a protective matrix.

8. A process for the production of low carbon iron or steel directly from iron ore which comprises heating a mixture of iron ore and slag forming flux materials through a rotary kiln in the absence of solid carburizing agents, maintaining an oxidizing atmosphere in an initial portion of the kiln at a temperature to oxidize and vaporize such impurities in the ore as zinc, sulphur, phosphorous and cadmium, maintaining a highly reducing atmosphere in a subsequent portion of the kiln at a temperature between 800° and 1000° C. to reduce the iron oxides in the ore to minute particles of metallic iron, and maintaining the temperature in a subsequent portion of the kiln between 1400° and 1500° C., thereby to melt the flux materials into molten, semi-liquid slag and to agglomerate the particles of iron into globules or pellets in the molten slag as a protective matrix.

9. A process for the production of low carbon iron or steel directly from iron ore which comprises feeding a granulated mixture of iron ore and slag forming flux materials through a rotary kiln in the absence of solid carburizing agents, maintaining the temperature at the upper end of the kiln sufficiently high to dehydrate the material and to drive off earthy organic materials, raising the temperature in a subsequent portion of the kiln to a calcining temperature to oxidize and vaporize such impurities as zinc, sulphur, phosphorous and cadmium, maintaining a highly reducing atmosphere at a higher temperature in a subsequent portion of the kiln to reduce the iron oxides in the ore to minute particles of metallic iron, and maintaining at the lower end of the kiln a temperature above 1400° C., thereby to melt the flux materials into a molten, semi-liquid flux and to agglomerate the metallic particles into globules or pellets in the molten slag as a protective matrix.

10. In the production of low carbon iron or steel directly from iron ores, the steps which comprise subjecting granulated ore and slag forming flux materials to sufficient heat in an oxidizing atmosphere in the absence of carburizing agents to oxidize and vaporize such impurities as zinc, sulphur, phosphorous, and cadmium, the absence of carburizing agents serving to prevent the formation of carbides of said impurities, subjecting the ore and the flux in intimate mixture to a hot reducing atmosphere to convert the iron oxides into particles of metallic iron, and raising the temperature of the material while continuously agitating the same to melt the flux into a molten, semi-liquid mass and to agglomerate the particles into globules or pellets in the molten flux as a protective matrix.

11. A process for the production of low carbon iron or steel directly from iron ore which comprises mixing the ore with limestone and silicate materials in such proportions as to form a slag of from 1 to 2.5 silicate degree, feeding the mix through a rotary kiln, maintaining a highly reducing atmosphere in a portion of said kiln to convert the oxides in the ore into minute particles of metallic iron, raising the temperature of the materials to form a molten, semi-liquid slag and agglomerating said particles into globules or pellets in the slag as a protective matrix.

12. A process for the production of low carbon iron or steel directly from iron ore, which comprises feeding a mixture of granulated ore and slag forming flux materials in the absence of solid carburizing agents through a rotary kiln, maintaining in the kiln a highly reducing atmosphere at an elevated temperature, to reduce the iron oxides to minute particles of metallic iron, agglomerating said particles into globules or pellets in the molten, semi-liquid slag, and delivering the resulting cinder to a reverberatory furnace for the separation of the metallic iron from the slag.

13. A process for the production of low carbon iron or steel directly from iron ore which comprises feeding a mixture of crushed iron ore and slag forming flux materials in the absence of solid carburizing agents through a rotary kiln, injecting from the discharge end of the kiln a high pressure stream of carbonaceous fuel and thereby raising the carbon content of the atmosphere in the kiln throughout a desired zone to produce a highly reducing atmosphere in said zone, subjecting the mixture in the zone to a temperature to reduce the iron oxides in the ore to particles of metallic iron and to convert the slag forming flux materials into a molten semi-liquid slag, and thereafter agglomerating the particles into globules or pellets in the slag as a protective matrix.

14. A process for the production of low carbon iron or steel directly from iron ore which comprises feeding a mixture of crushed iron ore and slag forming flux materials in the absence of solid carburizing agents through a rotary kiln, injecting from the discharge end of the kiln a high pressure stream of flue gases and carbonaceous fuel and thereby raising the carbon content of the atmosphere in the kiln throughout a desired zone to produce a highly reducing atmosphere in said zone, subjecting the mixture in the zone to a temperature to reduce the iron oxides in the ore to metallic iron and to convert the slag forming flux materials into a molten semi-liquid slag, and thereafter agglomerating the particles into globules or pellets in the slag as a protective matrix.

15. A process for the production of iron or steel having a controlled low carbon content directly from iron ore, which comprises feeding a mixture of crushed iron ore and slag forming flux materials in the absence of solid carburizing agents through a rotary kiln, subjecting the mixture in the kiln to a reducing atmosphere at a temperature serving to reduce the iron oxides in the ore to particles of iron, to form a molten, semi-liquid slag, and to agglomerate the particles into globules or pellets in the slag as a protective matrix, maintaining the pressure of said atmosphere in the kiln above outside atmospheric pressure, and controlling the composition of the iron in the particles and globules or pellets by varying the temperature, the chemical composition or the pressure of said atmosphere.

FLAVIUS C. WOOD, Jr.